US010223328B1

(12) United States Patent
Wei et al.

(10) Patent No.: US 10,223,328 B1
(45) Date of Patent: Mar. 5, 2019

(54) UNIFIED SYSTEM FOR CONNECTING A CONTENT REPOSITORY TO A FILE SHARING SERVICE

(71) Applicant: EMC Corporation, Hopkinton, MA (US)

(72) Inventors: Shu-Shang Sam Wei, Danville, CA (US); Dmitrii Korshunov, Pleasanton, CA (US); Linda J. Wong, Dublin, CA (US); Dmitri Limonov, Dublin, CA (US); Philip D. Wong, San Ramon, CA (US); Katya Zavalkovsky, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 331 days.

(21) Appl. No.: 14/231,194

(22) Filed: Mar. 31, 2014

Related U.S. Application Data

(60) Provisional application No. 61/935,216, filed on Feb. 3, 2014.

(51) Int. Cl.
*G06F 16/23* (2019.01)

(52) U.S. Cl.
CPC ................... *G06F 16/235* (2019.01)

(58) Field of Classification Search
CPC .............................. G06F 17/30174
See application file for complete search history.

(56) References Cited

U.S. PATENT DOCUMENTS

| 7,516,132 | B1* | 4/2009 | Fast ..................... H04L 67/1095 |
| 8,850,516 | B1* | 9/2014 | Hrebicek .......... G06F 17/30174 707/610 |
| 9,104,742 | B1* | 8/2015 | Wei ................... G06F 17/30581 |
| 9,213,718 | B1* | 12/2015 | Hrebicek ................ H04L 67/06 |
| 9,251,114 | B1* | 2/2016 | Ancin ............... G06F 15/17331 |
| 2008/0267221 | A1* | 10/2008 | Ozzie ................ G06F 17/30581 370/503 |
| 2008/0270481 | A1* | 10/2008 | Augustine ......... G06F 17/30581 |
| 2009/0125526 | A1* | 5/2009 | Neufeld ............. G06F 17/30575 |
| 2009/0138808 | A1* | 5/2009 | Moromisato .......... G06Q 10/10 715/758 |
| 2009/0300169 | A1* | 12/2009 | Sagar ...................... H04L 12/24 709/224 |
| 2010/0030858 | A1* | 2/2010 | Chasin ................. G06Q 10/107 709/206 |
| 2010/0198871 | A1* | 8/2010 | Stiegler ............. G06F 17/30168 707/783 |
| 2010/0287221 | A1* | 11/2010 | Battepati ........... G06F 17/30165 707/803 |
| 2011/0078197 | A1* | 3/2011 | Zurko et al. ............ G06F 17/30 707/803 |

(Continued)

*Primary Examiner* — Mohammad S Rostami
(74) *Attorney, Agent, or Firm* — Van Pelt, Yi & James LLP

(57) ABSTRACT

Techniques to provide access to repository content, via a file sharing service, are disclosed. In various embodiments, a revised content associated with a repository content object, reflecting a modification made to the repository content in the context of a file sharing service to which the repository content object was published in connection with a synchronized share of the repository object, is received. It is determined whether the revised content is to be stored in the repository and, if so, the revised content is stored in the repository.

26 Claims, 9 Drawing Sheets

(56) References Cited

U.S. PATENT DOCUMENTS

| | | | | |
|---|---|---|---|---|
| 2011/0153728 A1* | 6/2011 | Einarsson | ......... | H04W 52/0229 |
| | | | | 709/203 |
| 2012/0317135 A1* | 12/2012 | Jin et al. | ................. | G06F 17/30 |
| | | | | 707/769 |
| 2012/0331021 A1* | 12/2012 | Lord | ................... | G06F 17/3015 |
| | | | | 707/826 |
| 2013/0124724 A1* | 5/2013 | Madgwick | .............. | H04L 43/12 |
| | | | | 709/224 |
| 2013/0262862 A1* | 10/2013 | Hartley | ................. | G06F 21/602 |
| | | | | 713/165 |
| 2013/0311947 A1* | 11/2013 | Tsai | .................... | G06F 3/04842 |
| | | | | 715/815 |
| 2014/0006465 A1* | 1/2014 | Davis | ................ | G06F 17/30194 |
| | | | | 707/827 |
| 2014/0059162 A1* | 2/2014 | Herbrich | ........... | G06F 17/30578 |
| | | | | 709/217 |
| 2014/0075518 A1* | 3/2014 | D'Souza | ................ | H04L 63/00 |
| | | | | 726/4 |
| 2014/0188803 A1* | 7/2014 | James | ............... | G06F 17/30174 |
| | | | | 707/638 |
| 2014/0229839 A1* | 8/2014 | Lynch | ................ | G06F 9/44505 |
| | | | | 715/736 |
| 2014/0278808 A1* | 9/2014 | Iyoob | ................ | G06Q 30/0206 |
| | | | | 705/7.35 |
| 2014/0379647 A1* | 12/2014 | Smith | ............... | G06F 17/30174 |
| | | | | 707/624 |
| 2015/0026237 A1* | 1/2015 | Kaplinger | ......... | G06F 17/30174 |
| | | | | 709/203 |
| 2015/0220558 A1* | 8/2015 | Snibbe | ................ | H04N 21/854 |
| | | | | 707/627 |

* cited by examiner

UNIFIED SYSTEM FOR CONNECTING A CONTENT REPOSITORY TO A FILE SHARING SERVICE

CROSS REFERENCE TO OTHER APPLICATIONS

This application claims priority to U.S. Provisional Patent Application No. 61/935,216 entitled UNIFIED SYSTEM FOR CONNECTING A CONTENT REPOSITORY TO A FILE SHARING SERVICE filed Feb. 3, 2014, which is incorporated herein by reference for all purposes.

BACKGROUND OF THE INVENTION

Solutions have been provided to connect a content repository (for example, EMC® Documentum®) and a file sharing service (for example, EMC® Syncplicity®). Prior approaches, e.g., EMC® Syncplicity® Connector for Documentum® version 1.0, have enabled repository content to be shared via a file sharing service, but to date such access has been limited to allow file share users to access a copy of content as stored in the repository.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details.

Connecting a content repository to a file sharing service in a manner that enables changes to content made in the context of the file sharing service to be propagated back to the content repository is disclosed.

Figure 1A:
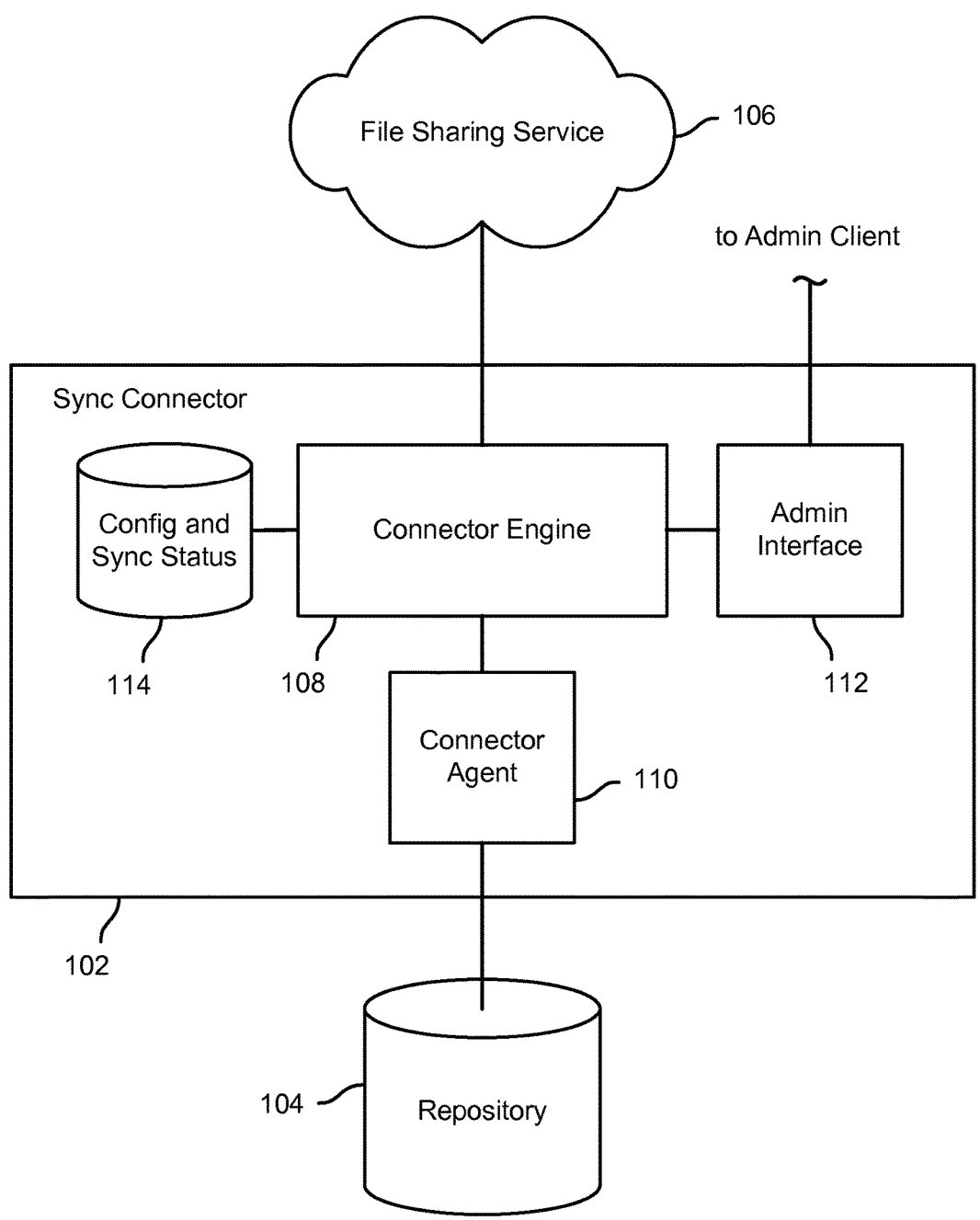
FIG. 1A is a block diagram illustrating an embodiment of a system to connect a content repository to a file sharing service.

FIG. 1A is a block diagram illustrating an embodiment of a system to connect a content repository to a file sharing service. In the example shown, a synchronization connector 102 connects a content repository 104 to a file sharing service 106. A connector engine 108 provides synchronization between the repository 104 and file sharing service 106, for example, by publishing content and/or updates from repository 104 to corresponding instances of the same content shared via file sharing service 106. Connector engine 108 uses a connector agent 110 to establish and use a connection to repository 104, for example to obtain content and/or updates from repository and to publish same via file sharing service 106; and/or to propagate back to repository 104 changes to content made in the context of file sharing service 106.

In various embodiments, connector engine 108 manages interactions between file sharing service 106 and a platform independent framework which handles global settings and generic tasks between file sharing service 106 and content repository 104. Connector agent 110 provides a bridge between connector engine 108 and content repository 104. For example, in various embodiments, a Syncplicity® Connector Agent for Documentum® (110) serves as a bridge between connector engine 108 and an EMC® Documentum® content repository (104) to enable Documentum® folders and files to be shared via a file sharing service, such as Syncplicity®.

Figure 1B:
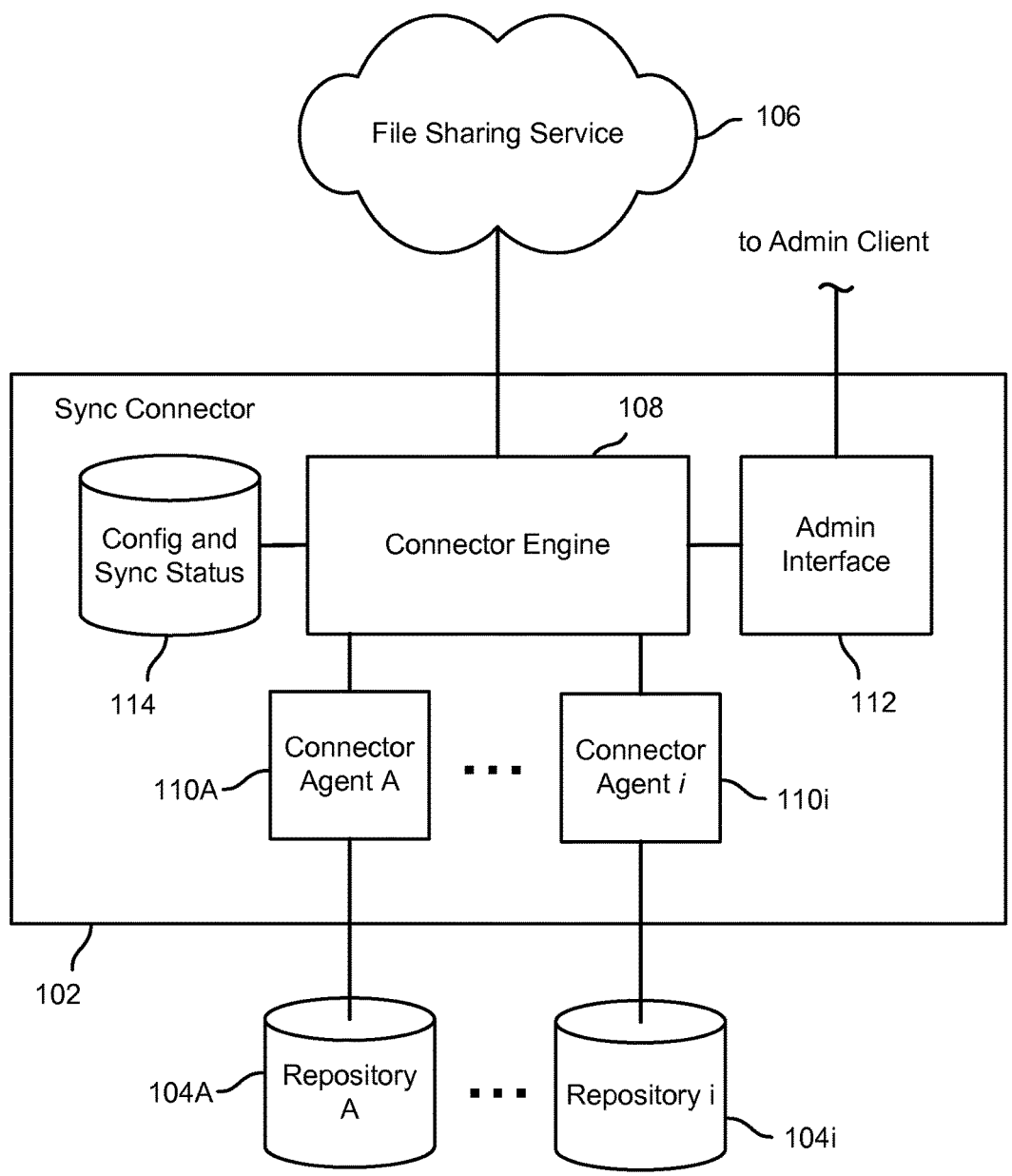
FIG. 1B is a block diagram illustrating an embodiment of a system to connect a content repository to a file sharing service.

FIG. 1B is a block diagram illustrating an embodiment of a system to connect a content repository to a file sharing service. In the example shown, a plurality of connector agents, represented in FIG. 1B by connector agents 110A and 110i, each is associated with and conforms to one or more application programming interface (API) or other interfaces of a corresponding content repository (represented in FIG. 1B by repositories 104A and 104i with which the connector agent is associated. Connector engine 108 manages interactions between file sharing service 106 and a platform independent framework which handles global settings and generic tasks between file sharing service 106 and the respective content repositories, e.g., repository 104A and repository 104i, with the respective connector agents, such as connector agent 110A and connector agent 110i each providing a bridge between connector engine 108 and a corresponding content repository, e.g., repository 104A and repository 104i, respectively, with which the connector agent is associated.

Referring further to FIGS. 1A and 1B, in various embodiments a connector administrator component 112 provides a user interface (UI) tool to set connection info and mapping repository folders to file sharing service folders with optional rules and policies. A persistent store 114, e.g., a database system, is used to store synchronization information, status, and cross reference information.

In some embodiments, a super user account is provided for use by the connector. The connector may connect to the content repository using a content repository credential of an administrative or other user with which a particular file sharing service "share" is associated. In some embodiments, two levels of "share" user may be defined. A first, higher level of share user is able to create "shares" of content repository files and folders, and also to define administrative policies to govern configurable aspects of a "share", for example, how changes made in the context of the file sharing service are to be stored persistently in the content repository, e.g., major version (1.0, 2.0, etc.), minor version (1.1, 1.2, etc.), or overwrite the current content repository object. A second, lower level of share user is able to create "shares" of content repository files and folders, but only subject to administrative policies that have been defined and set by others. For example, a user of this second type may be able to share content repository files and folders, but subject to a policy set by another, higher-level (e.g., administrative) user.

In various embodiments, policies may be set to control on a content repository attribute level (e.g., document type, file format, etc.) how content repository items will be shared via the file sharing service and/or a manner and/or extent to which changes made in the context of the file sharing service may be stored in the content repository. For example, policies may cause content in the content repository to be shared with the file sharing service only if the content was created after a specified date.

In some embodiments, a conflict resolution mechanism of the file sharing service is used to resolve any conflicts among competing modifications that may be attempted to be made concurrently to content repository content that has been shared via the file sharing service. Once one or more definitive versions have been determined by the file sharing service conflict resolution mechanism, the connection stores the one or more versions persistently in the content repository, e.g., in a manner indicated by applicable policies as to how changes made in the context of the file sharing service to content repository objects that have been shared via the file sharing service are to be stored in the content repository.

Figure 2:
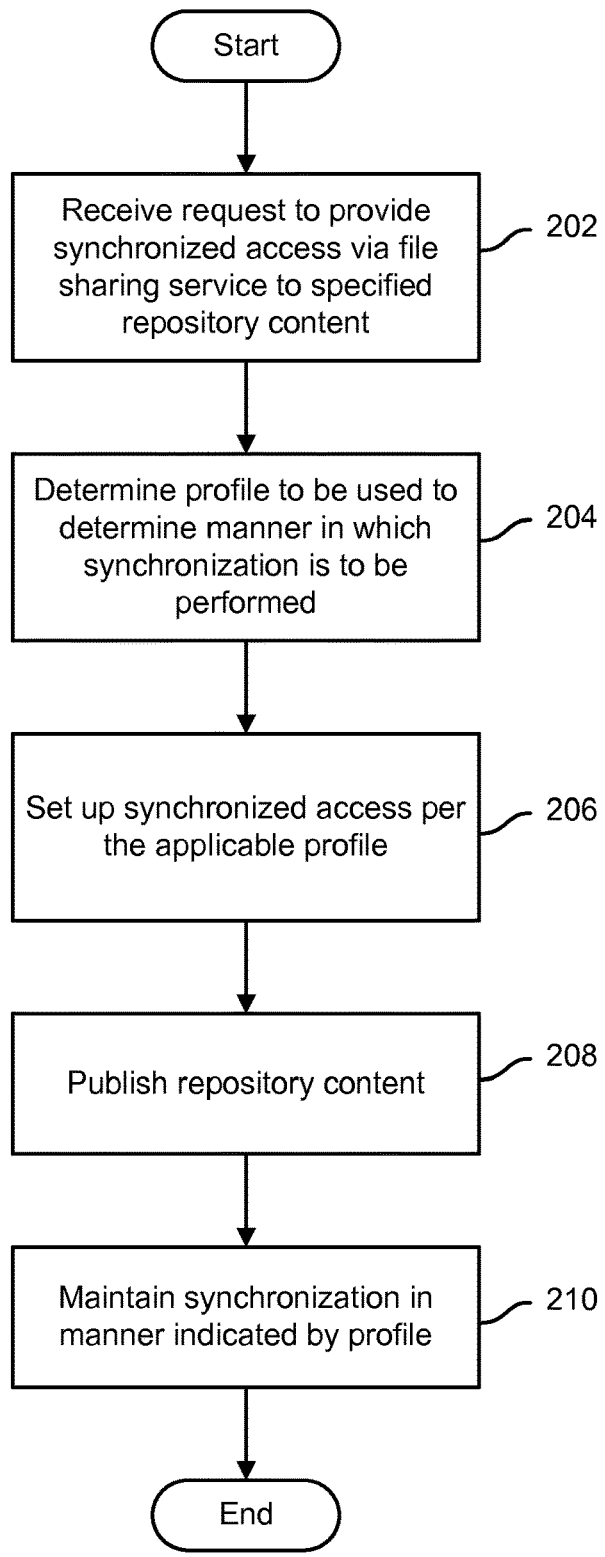
FIG. 2 is a flow chart illustrating an embodiment of a process to connect a content repository to a file sharing service.

FIG. 2 is a flow chart illustrating an embodiment of a process to connect a content repository to a file sharing service. In various embodiments, the process of FIG. 2 may be implemented by a synchronization connector, such as synchronization connector 102 of FIGS. 1A and 1B. In the example shown in FIG. 2, a request to provide synchronized access via a file sharing service to content stored in a content repository is received (202), e.g., via an administrative or other share user interface such as interface 112 of FIGS. 1A and 1B. For example, an indication may be received, via an interface such as interface 112 of FIGS. 1A and 1B, that a specified content repository folder is to be shared via the file sharing service, for example by synchronizing to a specified file sharing service folder (or other logical structure, such as a synchronization or other share "point") at least a subset of the repository content associated with the repository folder. In various embodiments, "synchronized access" means publishing repository content via the file sharing service, and maintaining synchronization between the content as published via the file sharing service and as stored in the repository, for example and without limitation by propagating via the file sharing service modifications to content as stored at the repository and propagating back to the repository changes to the content made in the context of the file sharing service.

A profile or other configuration data to be used to determine a manner in which the synchronized access is to be provided is determined (204). In some embodiments, a profile specifying one or more configuration of other parameters concerning how synchronized access repository content is to be provided via the file sharing service may be read from a profile data stored in a configuration or other database, such as database 114 of FIGS. 1A and 1B. For example, a default profile set by a system administrator, a user-specified profile set up previously by the user, or a role-based profile associated with a role with which the requesting user is associated may be used. In some embodiments, once a profile has been setup, the profile may be used by any authorized share user. In some embodiments, a share user with sufficient privileges may specify in connection with a request to share a repository folder (or other repository content, such as individual content objects, etc.) one or more configuration or other parameters indicating a manner in which the content is to be shared via the file sharing service. In various embodiments, a profile or other configuration data indicating a manner in which synchronized access to repository content is to be provided via a file sharing service may indicate, without limitation, one or more of the following:

whether the synchronization is to be one-way (publish from content repository to file sharing service only) or two-way (publish to file sharing service and store in repository at least certain revisions made in the context of the file sharing service);

which renditions, file formats, etc. are to be published via the file sharing service;

which object types are to be included in the share;

attribute-based rules to determine which repository folder content is to be included (e.g., rules specifying one or more of a property, condition, and a value, such as {"created by" "is" "User ABC"} or {"Created" "before" "Jan. 1, 2000"}).

how changes made in the context of the file sharing service are to be stored persistently in the content repository, e.g., major version (1.0, 2.0, etc.), minor version (1.1, 1.2, etc.), or overwrite the current content repository object, or as a new rendition of the object or as a "clone" or other new object;

how the values of one or more attributes of a version stored based on revisions made in the context of the file sharing service are to be determined.

Referring further to FIG. 2, synchronized access to the specified repository content is provided, in the manner indicated in the applicable profile or other configuration data (206). For example, a repository folder identified in the request may be associated with a file sharing service folder (or other logical structure) that has been or is to be shared with the file sharing service users to whom the share user has indicated the content is to be provided via the file sharing service. The repository content to which synchronized access is to be provided is retrieved from the repository and published via the file sharing service (208). Synchronization between content as published to, and potentially modified in the context of, the file sharing service, on the one hand, and the repository, on the other hand, is maintained (210). For example, a connector engine such as connector engine 108 of FIGS. 1A and 1B may poll or otherwise listen for changes made in either the context of the file sharing service or in the context of the content repository, and may propagate to one domain changes made in the context of the other domain (i.e., from the file sharing service to the content repository or vice versa).

Figure 3:
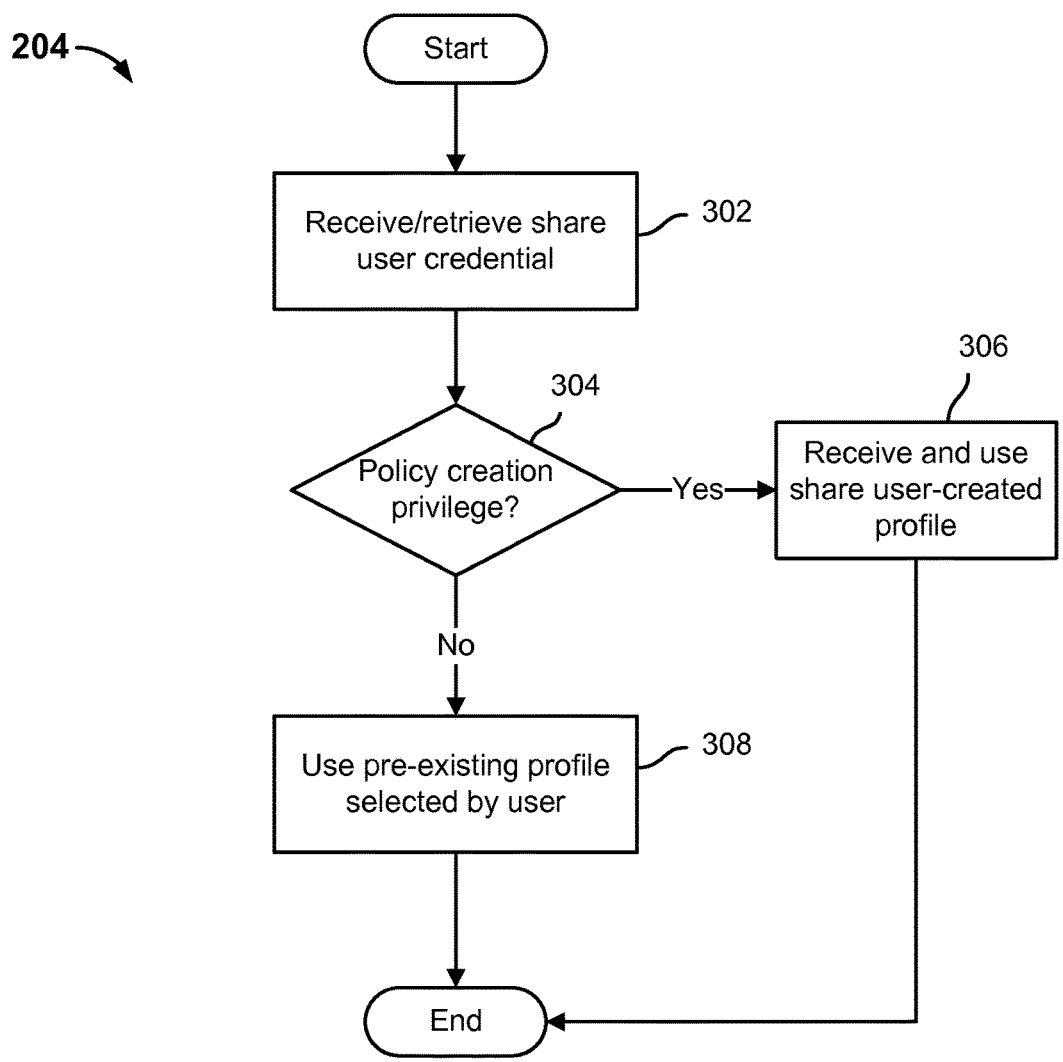
FIG. 3 is a flow chart illustrating an embodiment of a process to connect a content repository to a file sharing service.

FIG. 3 is a flow chart illustrating an embodiment of a process to connect a content repository to a file sharing service. In some embodiments, step 204 of the process of FIG. 2 may include the process of FIG. 3. In the example shown in FIG. 3, a share user's credential is received and/or retrieved (302). For example, the share user, i.e., a user authorized to use a synchronization connector to provide synchronized access, via a file sharing service, to repository content, may provide the share user's repository or other credential in connection with logging in to the synchronization connector, such as via an administrative or other user interface. If the share user is determined, based on the share user's credential, to be entitled to create a profile, policy, or other configuration data indicating how synchronized access to repository content is to be provided (304), an administrative or other user interface is provided to enable the share user to specify such parameters (306). Otherwise, a profile that has been set up by another is used (308).

Figure 4:
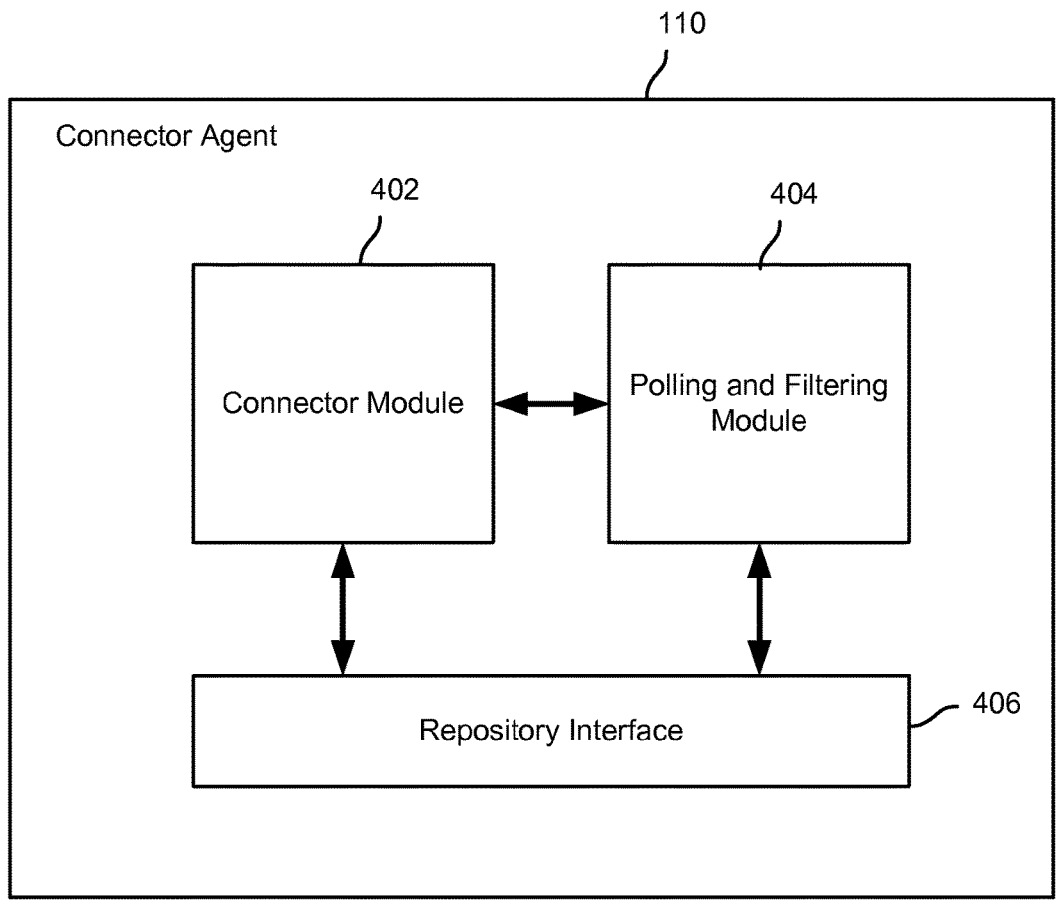
FIG. 4 is a block diagram illustrating an embodiment of a connector agent to connect to a content repository.

FIG. 4 is a block diagram illustrating an embodiment of a connector agent to connect to a content repository. In some embodiments, connector agent 110 of FIGS. 1A and 1B may be implemented as shown in FIG. 4. In the example shown, connector agent 110 includes a connector module 402 which establishes and manages one or more connections to a content repository (not shown in FIG. 4) with which the connector agent 110 is associated. For example, a connection to the repository may be made on behalf of a repository user who has requested to provide synchronized access to repository content via a file sharing the service with which the connector agent 110 is associated. In the example shown, connector agent 110 includes polling and filtering module 404. In various embodiments, polling and filtering module 404 checks periodically with the content repository to determine if any changes have been made in the context of the repository to content associated with a repository folder (or other logical structure) at least some of the content of which has been shared via the file sharing service. If changes are detected, filtering settings, rules, etc. may be applied to determine whether (or which of) the changes should be propagated via the file sharing service. For changes at the repository which are determined by the polling and filtering module 404 to be subject to being propagated via the file sharing service, in some embodiments the polling and filtering module 404 invokes the connector module 402 and causes the connector module 402 to obtain the revised content from the repository and publish the revised content via the file sharing service, for example via a connector engine such as connector engine 108 of FIGS. 1A and 1B. In the example shown, each of the connector module 402 and the polling and filtering module 404 communicates with the repository via a repository interface 406. In some alternative embodiments, each of the connector module 402 and the polling and filtering module 404 may communicate directly with the repository.

Figure 5:
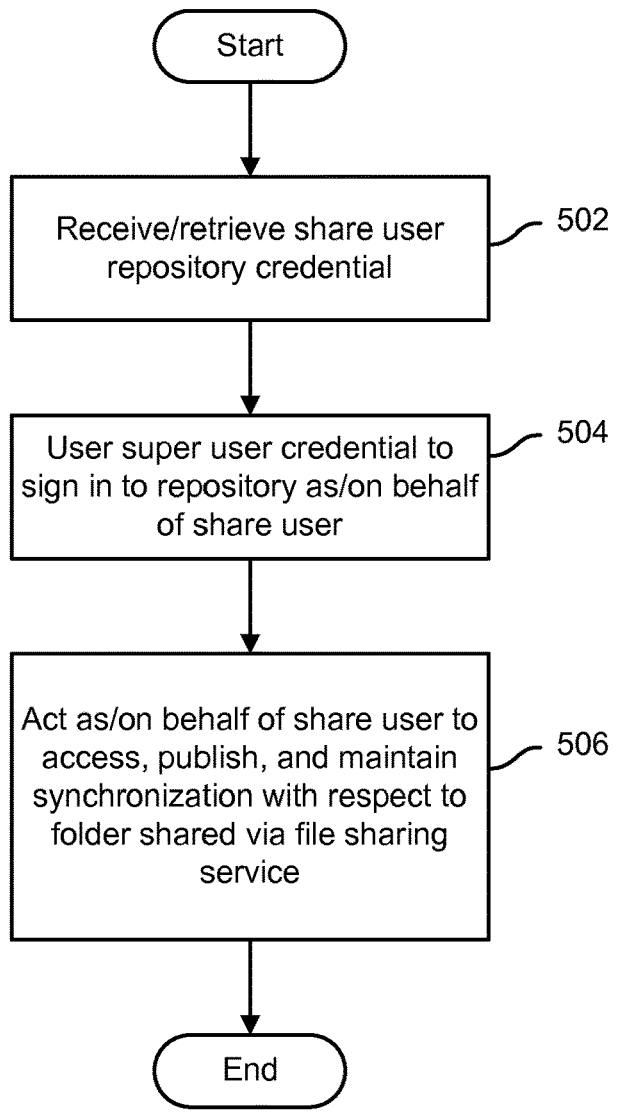
FIG. 5 is a flow chart illustrating an embodiment of a process to connect to a content repository.

FIG. 5 is a flow chart illustrating an embodiment of a process to connect to a content repository. In some embodiments, the process of FIG. 5 may be implemented by a connector agent component or module, such as the connector module 402 of FIG. 4. In the example shown, a share user's repository credential is received and/or retrieved (502). For example, in some embodiments the share user may provide the share user's repository credential via a user interface provided to enable the share user to cause synchronized access to repository content to be provided via a file sharing service. A super user credential is used to sign in to the repository as and/or on behalf of the share user (504). For example, the connector module 402 or some other component or module may invoke an API or other interface of the content repository and may present the share user's repository credential to sign in to the repository. In various embodiments, signing in as and/or on behalf of the share user ensures that access is provided by the content repository, for purposes of sharing of content via the file sharing service, only to repository content the share user is entitled to share, e.g., based in the share user's privileges with respect to the repository. Action is taken, at least in part by using the share user's credential, to access, publish, and maintain synchronization with respect to a repository folder and/or otherwise designated set of repository content to which the share user has indicated a desire to provide synchronized access via the file sharing service (506). For example, the share user's repository credential may be used to access and upload to the connector engine 108, via the connector agent 110, repository content as stored in the repository; to periodically poll the repository to detect changes made on the repository side to such repository content; and to store in the repository corresponding revised content that has been revised in the context of the file sharing service (e.g., if the share has been set up to provide for such revisions to be stored at the repository).

Figure 6:
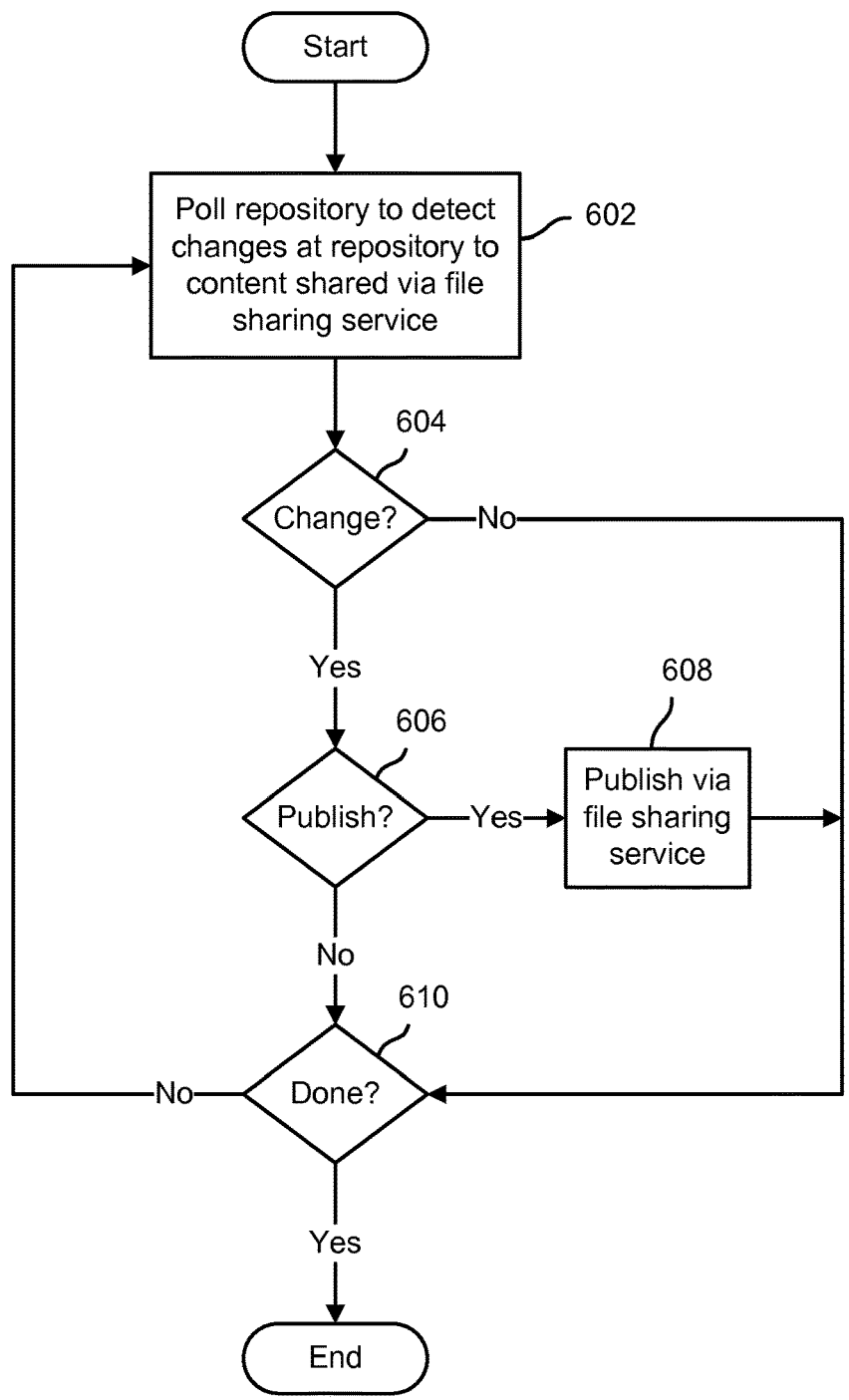
FIG. 6 is a flow chart illustrating an embodiment of a process to propagate via a file sharing services at least selected revised content from a content repository.

FIG. 6 is a flow chart illustrating an embodiment of a process to propagate via a file sharing services at least selected revised content from a content repository. In various embodiments, a connector agent component such as polling and filtering module 404 of FIG. 4 may implement the process of FIG. 6. In the example shown, the repository is polled to detect changes made, if any, at the repository to repository content to which synchronize access is being provided via a file sharing service (602). If changes are detected (604), it is determined whether (or which of) the changes are to be propagated via the file sharing service (606). For example, in some embodiments, a change at the repository to a "rendition" or other instance or representation of a shared content item that is not one that has been published via the file sharing service, e.g., in accordance with an applicable profile or other configuration data, then the change is not published via the file sharing service. Other examples of changes at the repository that may not be published via the file sharing service may include, without limitation, changes to content having an object or other type that was not included in the repository content as shared via the file sharing service. If a detected change (604) is determined to be one that should be propagated via the file sharing service (606), the revised content is published to the file sharing service (608). For example, in some embodiments, the connector engine and/or another component of the synchronization connector is included as a file sharing service user or other participant in a share folder, point, etc. via which synchronized access to repository content is being provided to file sharing service users via the file sharing service. Revised content may be published via the file sharing service, in various embodiments, at least in part by retrieving the revised content from the repository and providing it to the file sharing service as revised content, to be synchronized and shared via the file sharing service. The process of FIG. 6 continues, with subsequent iterations of polling for and selectively publishing changes made on the content repository side (602, 604, 606, 608) until done (610), e.g., synchronized access is no longer being provided.

Figure 7:
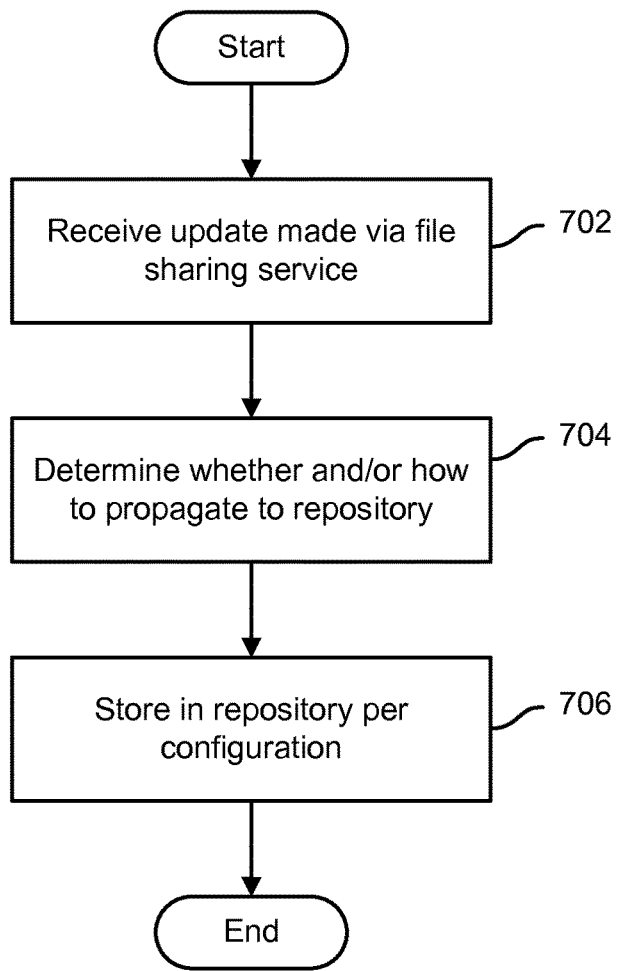
FIG. 7 is a flow chart illustrating an embodiment of a process to synchronize to a repository content modified in the context of a file sharing service.

FIG. 7 is a flow chart illustrating an embodiment of a process to synchronize to a repository content modified in the context of a file sharing service. In various embodiments, the process of FIG. 7 may be performed by a connector engine, such as connector engine 108 of FIGS. 1A and 1B. In the example shown, revised content associated with repository content previously published to the file sharing service is received, reflecting revisions made in the context of the file sharing service to repository content as made available to one or more file sharing service users via the file sharing service (702). For example, in some embodiments, repository content may be made available via the file sharing service by publishing repository content to a folder or other logical structure of the file sharing service. A synchronization connector, such as synchronization connector 102 of FIGS. 1A and 1B, may be signed in as a user of the file sharing service and as a share participant with privilege to add content (or revised content) to and/or access content from the file sharing service folder or other logical structure. If one or more other file sharing service users make revisions to the repository content as published to the file sharing service, in various embodiments a content revision mechanism of the file sharing service will resolve conflicts, if any, among changes submitted by the respective users, and will determine a file sharing service content of record. For example, non-conflicting revisions made by one or more file sharing service users and saved or otherwise committed by the user(s) on the file sharing service side may result in the corresponding repository content as stored in the file sharing service folder or other logical structure being determined by the file sharing service to have been updated to incorporate the revisions.

Upon changes made in the file sharing service content having been finalized on the file sharing service side, a determination is made as to whether, and if so how, the file sharing service-side revisions should be propagated back to the repository (704). For example, if the revisions on the file sharing service side were made to the repository content item (e.g., document) and saved in the context of the file sharing service under the same file or other object name, in some embodiments the changes would be propagated back to the repository, e.g., if two-way synchronization were enabled. In various embodiments, the manner in which such revisions made on the file sharing service side would be saved to the repository may be determined based at least in part on a profile, configuration, or other setting associated with the repository to file sharing service share with which the content is associated. For example, as noted above, such revised content may be stored as an overwrite (revision) of the current repository object, as a major or minor version of the previously-published repository object, as a new (e.g., clone) repository object, etc.

Once the manner in which the content as revised on the file sharing service side is to be propagated to the repository has been determined, the revised content is stored in the repository in the determined manner (706). In various embodiments, status information at one or both of the synchronization connector and the file sharing service may be updated to reflect that the content as revised on the file sharing service side has been stored in the repository.

Figure 8:
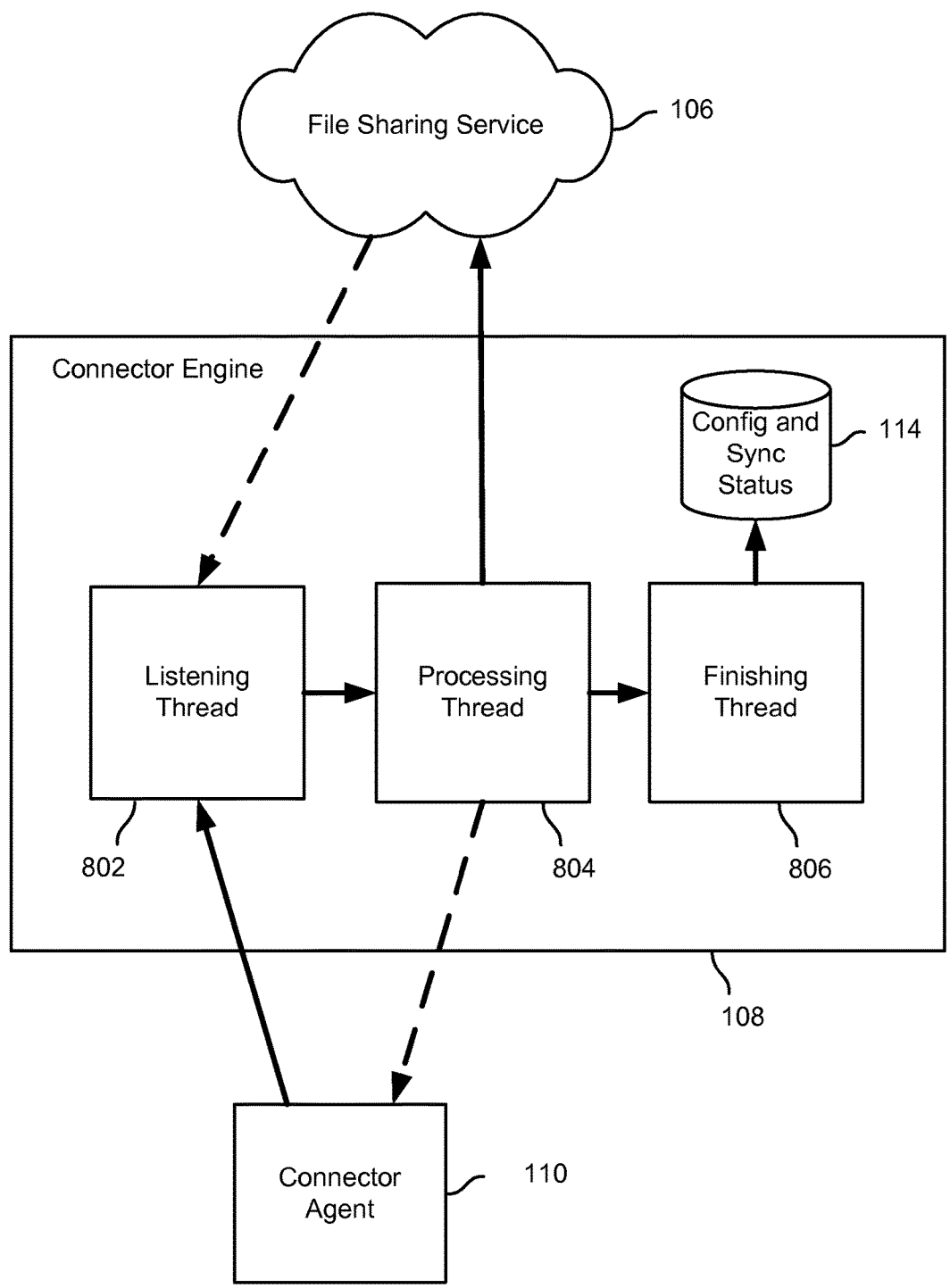
FIG. 8 is a block diagram illustrating an embodiment of a connector engine to connect a content repository to a file sharing service.

FIG. 8 is a block diagram illustrating an embodiment of a connector engine to connect a content repository to a file sharing service. In the example shown, an embodiment of the connector engine 108 of FIGS. 1A and 1B is shown to include a listening thread 802, a processing thread 804, and a finishing thread 806. In various embodiments, one or more other threads configured to perform optimization, filtering, prioritization, and/or other tasks may be included in addition to those shown in FIG. 8. In some embodiments, the listening thread 802 passively listens, actively polls, or otherwise monitors both the repository folder or other logical structure involved in a share of repository content via the file sharing service and the corresponding folder or other structure on the file sharing service side, to detect changes made on either side to repository content to which synchronized access is being provided via the file sharing service. For each detected change, the listening thread generates a task, notification, and/or other data to cause the processing thread 804 to propagate the detected change from the domain in which the change was made to the domain to which the change is to be propagated. As shown in FIG. 8, the solid line arrows drawn from connector agent 110 to listening thread 802 and from processing thread 804 to file sharing service 106 represent propagation to the file sharing service 106 of changes made in the context of a repository (not shown in FIG. 8) with which connector agent 110 is associated. Conversely, the dashed line arrows drawn from file sharing service 106 to listening thread 802 and from processing thread 804 to connector agent 110 represent propagation to the repository, via connector agent 110, of changes made in the context of file sharing service 106.

Finishing thread 806, in various embodiments, updates the configuration and synchronization status database 114 to reflect completion, e.g., by processing thread 804, of synchronization tasks initiated by listening thread 802. In some embodiments, listening thread 802 may create a task or other record in configuration and synchronization status database 114 when a change made on the file sharing service side that is to be propagated to the content repository, or vice versa, is detected. Upon completion of the synchronization task, finishing thread 806 updates the status to reflect that the detected changes have been propagated to the destination domain, i.e., file sharing service revisions to the content repository, or vice versa.

Using techniques disclosed herein, in various embodiments content repository objects may be shared via a file sharing service, and changes made in the context of the file sharing service may be persisted back to the content repository.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing access to repository content, comprising:
   receiving, from a client device associated with a user, a revised content associated with a repository content object, wherein the revised content reflects at least in part a modification made to the repository content object;
   determining that the revised content is to be stored in the repository, comprising determining how the revised content is to be shared via a file sharing service based at least in part on one or more policies associated with the user and determining whether to publish the revised content to the file sharing service in connection with the synchronized share based at least in part on whether the modification made to the repository content is in the context of a file sharing service to which the repository content object as stored in the repository was published in connection with a synchronized share of the repository object via the file sharing service, wherein at least one of the one or more policies are enforced at an attribute level of content to be shared via the file sharing service, and wherein the determining of how the revised content is to be shared via the file-sharing service comprises determining a manner in which the revised content is to be stored in the repository;
storing the revised content in the repository;
polling the repository for a change to a part of the repository associated with the file sharing service, wherein the repository is a central repository for a plurality of client devices; and
in response to determining that the repository content object was published in connection with the synchronized share of the repository object via the file sharing service and that the revised content is to be published via the file sharing service in connection with the synchronized share, publishing the revised content to the file sharing service in connection with the synchronized share.

2. The method of claim 1, wherein the revised content is received at least in part by participating in a file sharing service share to which the repository object was published and detecting that the revised content has been stored in connection with the file sharing service share.

3. The method of claim 2, wherein detecting that the revised content has been stored in connection with the file sharing service share comprises receiving an indication that the revised content has been saved in a share folder with which the file sharing service share is associated.

4. The method of claim 1, wherein determining that the revised content is to be stored in the repository includes reading a configuration data associated with the synchronized share.

5. The method of claim 4, wherein the configuration data indicates that changes made in the context of the file sharing service to the repository object are to be propagated to the repository.

6. The method of claim 5, wherein the configuration data indicates a manner in which changes made to the repository object in the context of the file sharing service are to be propagated to the repository.

7. The method of claim 6, wherein the indicated manner comprises one or more of the following: an update to a current version of the repository object as stored in the repository; a major version of the repository object as stored in the repository; a minor version of the repository object as stored in the repository; a new repository object; and a clone repository object.

8. The method of claim 1, wherein publishing the repository object to the file sharing service in connection with the synchronized share includes determining that the repository object is associated with the synchronize share.

9. The method of claim 8, wherein determining that the repository object is associated with the synchronize share includes determining that the repository object is associated with a repository folder with which the synchronized share is associated.

10. The method of claim 8, wherein determining that the repository object is associated with the synchronize share includes determining that the repository object includes applying a configuration data to metadata associated with the repository object at the repository to determine that the repository object meets a criteria to be published to the file sharing service in connection with the synchronized share.

11. The method of claim 10, wherein the criteria includes one or more of the following: the repository object is of an object type indicated in the configuration data; the repository object is in a format indicated in the configuration data; and the repository object has an attribute value that meets an attribute-based criteria in the configuration data.

12. The method of claim 1, wherein the repository comprises a first repository included in a plurality of repositories with respect to which synchronized sharing is being provided; and wherein storing the revised content in the repository includes providing the revised content via a generic repository interface to a first connector agent associated with the first repository.

13. The method of claim 1, wherein storing the revised content in the repository comprises using a repository credential of a share user with which the synchronized share is associated to store the revised content in the repository on behalf of the share user.

14. The method of claim 13, wherein using a repository credential of a share user with which the synchronized share is associated to store the revised content in the repository on behalf of the share user includes using a super user credential to log into the repository as or on behalf of the share user.

15. The method of claim 1, wherein the determining how the revised content is to be shared is further based at least in part on one or more higher-level policies to which the one or more policies associated with the user are subject.

16. The method of claim 1, wherein the determining that the revised content is to be stored in the repository further comprises applying a conflict resolution process in the event that a conflict between versions of the repository content object.

17. The method of claim 1, wherein the determining of how the revised content is to be shared via the file-sharing service comprises determining an extent to which the revised content is to be stored in the repository.

18. The method of claim 1, wherein the manner in which the revised content is to be stored in the repository is based at least in part on at least one of the one or more policies associated with the user.

19. The method of claim 1, wherein the determining the manner in which the revised content is to be stored in the repository comprises determining whether the revised content is to be stored so as to overwrite the repository content object.

20. The method of claim 1, wherein the one or more policies indicate a manner by which the revised content is to be synchronized.

21. The method of claim 20, wherein the one or more policies indicates whether the revised content is to be synchronized one-way or two-way.

22. A system to provide access to repository content, comprising:
a communication interface; and
a processor coupled to the communication interface and configured to:
receive, from a client device associated with a user, via the communication interface a revised content associated with a repository content object, wherein the revised content reflects at least in part a modification made to the repository content object;
determine that the revised content is to be stored in the repository, comprising determining how the revised content is to be shared via a file sharing service based at least in part on one or more policies associated with the user and determining whether to publish the revised content to the file sharing service in connection with the synchronized share based at least in part on whether the modification made to the repository content is in the context of a file sharing service to which the repository content object as stored in the repository was published in connection with a synchronized share of the repository object via the file sharing service, wherein at least one of the one or more policies are enforced at an attribute level of content to be shared via the file sharing service, and wherein the determining of how the revised content is to be shared via the file-sharing service comprises determining a manner in which the revised content is to be stored in the repository;

store the revised content in the repository;

poll the repository for a change to a part of the repository associated with the file sharing service, wherein the repository is a central repository for a plurality of client devices; and in response to determining that the repository content object was published in connection with the synchronized share of the repository object via the file sharing service and that the revised content is to be published via the file sharing service in connection with the synchronized share, publish the revised content to the file sharing service in connection with the synchronized share.

23. The system of claim 22, wherein the processor executes computer instructions to provide a connection engine to receive the revised content and provide the revised content to a connector agent associated with the repository.

24. The system of claim 23, wherein the processor executes computer instructions to provide the connector agent; and wherein the connector engine determines based at least in part on a synchronization profile that the revised content is to be stored in the repository.

25. The system of claim 24, wherein the synchronization profile indicates a manner in which the revised content is to be stored in the repository.

26. A computer program product to provide access to repository content, the computer program product being embodied in a non-transitory computer readable medium and comprising computer instructions for:

receiving, from a client device associated with a user, a revised content associated with a repository content object, wherein the revised content reflects at least in part a modification made to the repository content object;

determining that the revised content is to be stored in the repository, comprising determining how the revised content is to be shared via a file sharing service based at least in part on one or more policies associated with the user and determining whether to publish the revised content to the file sharing service in connection with the synchronized share based at least in part on whether the modification made to the repository content is in the context of a file sharing service to which the repository content object as stored in the repository was published in connection with a synchronized share of the repository object via the file sharing service, wherein at least one of the one or more policies are enforced at an attribute level of content to be shared via the file sharing service, and wherein the determining of how the revised content is to be shared via the file-sharing service comprises determining a manner in which the revised content is to be stored in the repository;

storing the revised content in the repository;

polling the repository for a change to a part of the repository associated with the file sharing service, wherein the repository is a central repository for a plurality of client devices; and in response to determining that the repository content object was published in connection with the synchronized share of the repository object via the file sharing service and that the revised content is to be published via the file sharing service in connection with the synchronized share, publishing the revised content to the file sharing service in connection with the synchronized share.

* * * * *